United States Patent
Samborsky

Patent Number: 5,251,278
Date of Patent: Oct. 5, 1993

[54] FIBER OPTIC MONITORING DEVICE

[76] Inventor: James K. Samborsky, 605 Groves Blvd., N. Augusta, S.C. 29841

[21] Appl. No.: 887,028

[22] Filed: May 22, 1992

[51] Int. Cl.⁵ .................................. G02B 6/26
[52] U.S. Cl. .............................. 385/48; 385/43; 385/44
[58] Field of Search .............. 385/48, 43, 44, 46, 385/47

[56] References Cited

U.S. PATENT DOCUMENTS

| | | | |
|---|---|---|---|
| 3,936,631 | 2/1976 | Muska | 250/227 |
| 4,019,051 | 4/1977 | Miller | 250/227 |
| 4,076,375 | 2/1978 | Muska et al. | 350/96.15 |
| 4,081,672 | 3/1978 | Caspers et al. | 250/227 |
| 4,089,584 | 5/1978 | Polczynski | 350/96.16 |
| 4,103,154 | 7/1978 | d'Auria et al. | 250/227 |
| 4,125,768 | 11/1978 | Jackson et al. | 250/227 |
| 4,130,345 | 12/1978 | Doellner | 385/44 |
| 4,173,390 | 11/1979 | Käch | 385/44 |
| 4,176,908 | 12/1979 | Wagner | 350/96.15 |
| 4,296,995 | 10/1981 | Bickel | 350/96.15 |
| 4,307,932 | 12/1981 | Winzer | 350/96.15 |
| 4,346,961 | 8/1982 | Porter | 350/96.16 |
| 4,351,585 | 9/1982 | Winzer et al. | 350/96.15 |
| 4,378,143 | 3/1983 | Winzer | 385/44 |
| 4,456,329 | 6/1984 | Henderson et al. | 385/44 |
| 4,475,789 | 10/1984 | Kahn | 350/96.15 |
| 4,549,782 | 10/1985 | Miller | 350/96.16 |
| 4,557,550 | 12/1985 | Beals et al. | 350/96.15 |
| 4,618,211 | 10/1986 | Fleury | 350/96.15 |
| 4,678,265 | 7/1987 | Fink et al. | 350/96.20 |
| 4,750,795 | 6/1988 | Blotekjaer | 350/96.15 |

Primary Examiner—John D. Lee
Assistant Examiner—Phan T. Heartney
Attorney, Agent, or Firm—Harold M. Dixon; William R. Moser; Richard E. Constant

[57] ABSTRACT

A device for the purpose of monitoring light transmissions in optical fibers comprises a fiber optic tap that optically diverts a fraction of a transmitted optical signal without disrupting the integrity of the signal. The diverted signal is carried, preferably by the fiber optic tap, to a lens or lens system that disperses the light over a solid angle that facilitates viewing. The dispersed light indicates whether or not the monitored optical fiber or system of optical fibers is currently transmitting optical information.

8 Claims, 1 Drawing Sheet

5,251,278

FIBER OPTIC MONITORING DEVICE

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention:

The present invention relates to monitoring devices for optical fibers. More particularly, the present invention relates to taps on optical fibers for monitoring the transmission of fiber optic signals.

2. Discussion of Background:

Devices and methods for monitoring the transmission of fiber optic signals are well known. Furthermore, taps on fiber optic cables for purposes of monitoring optical transmission are known. With a typical fiber optic tap, a predetermined fraction of light from an optical fiber is diverted from the fiber and directed to a photodetector or other light conversion device. Fink, et al (U.S. Pat. No. 4,678,265), and Kahn (U.S. Pat. No. 4,475,789) disclose fiber optic taps for monitoring purposes. Fink, et al use a fiber optic plug device that converts optical signals into electrical signals for monitoring the intensity of an optical transmitter. Kahn discloses a splicing configuration and the use of a photodetector to monitor optical signals in a fiber.

The use of light display elements in conjunction with fiber optic taps is also known. In addition to photodetectors, LEDs, and the like, lenses have also been used (see U.S. Pat. No. 4,475,789, col. 3, lines 29+ and U.S. Pat. No. 4,081,672, col. 2, lines 64+). However, the lenses used in the prior art converge or focus light or direct it to the input of other devices for processing or display.

Nothing in these references teaches a device or method that provides monitoring from the diverted fraction of the fiber optic signal in a way that can be readily observed by the unaided human eye. There exists a need for such a device for rapid monitoring of fiber optic transmissions.

SUMMARY OF THE INVENTION

According to its major aspects and broadly stated, the present invention is a device for monitoring transmitted optical signals. In particular, the present invention is a fiber optic tap that optically diverts a portion of a transmitted optical signal's intensity without disrupting the integrity of the transmitted signal's optical information; that is, the signal information will not be lost in whole or in part when received as a result of the removal of a portion of it. The diverted portion of the transmitted signal is carried to a lens or lens system that disperses the light signal over a solid angle sufficient for unaided viewing; that is, the viewer does not have to be in substantial alignment with the axis of the fiber optical tap. The presence of light dispersed by the lens indicates that the fiber optic cable of interest is currently transmitting optical information.

A major feature of the present invention is the simplicity of construction. The device does not use many optical connections in order to monitor the transmission of fiber optic signals; rather, it uses a single optical fiber to tap into the optical fiber of interest and a dispersing lens. The advantage of this feature is that it allows convenient and immediate—at a glance—determination of the optical fiber's operational state. A person monitoring the fiber optic system only has to observe if light is being dispersed from the lens in order to determine the system's optional state. More sophisticated monitoring and display systems rely on exact alignments and connections of several optical elements, thus they may not be suitable for less than ideal environments or applications or low cost monitoring needs.

Another feature of the present invention is the use of a divergent lens or lens system to produce dispersed light. This feature allows the unaided human eye to effectively monitor the transmission of signals through an optical fiber or, alternatively, a plurality of optical fibers within a configured fiber optic system. Additional optical equipment is not necessary since the dispersed light from the divergent optical signal is functioning as the display, rather than being passed to additional non-human detection equipment for further processing. However, if the transmitted light exists is infrared, the use of an infrared sensitive phosphor to "convert" the infrared to visible light would be necessary.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
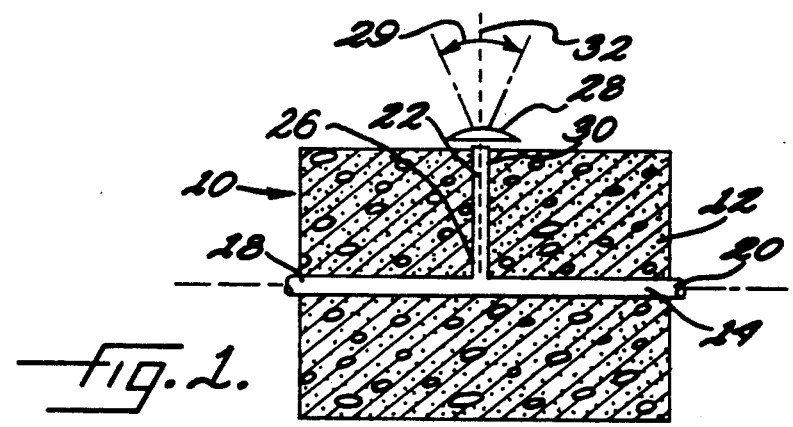
FIG. 1 is a side cross-sectional view of a fiber optic device according to a preferred embodiment of the present invention.

Referring now to FIG. 1, a housing 10 may be occupying a remote, cramped, or less than ideal environment. Housing 10 comprises a ceramic, metallic or plastic medium 12 or a frame adapted for carrying the optical fibers, containing a light carrying means 14 that is, preferably, an optical fiber, that carries transmitted optical signals from a transmitting end 18 through to a receiving end 20.

A tapping means 22, preferably a second optical fiber, connects or taps into light carrying means 14 at the connecting end 26 of tapping means 22. A viewing means 28 is generally attached to or aligned with the non-connecting end 30 of tapping means 22. Preferably, viewing means 28 is a divergent lens or lens system that disperses light into a solid angle 29 that facilitates otherwise unaided viewing at a glance and without the need to be substantially in alignment with the longitudinal axis 32 of tapping means 22.

Solid angle 29 does not have to be large; rather, solid angle 29 need be just sufficient to enable the viewer to see light without having to be in substantial alignment with the axis of the optical fiber. To some extent, the size of solid angle 29 will depend on the environment and the amount of light being tapped off from the main transmission signal. If the environment is dim or dark, a wider angle is possible because a lower intensity of light as a result of being spread over a larger solid angle will still be visible. Similarly, if the transmitting optical fiber is carrying light of a greater intensity, more light may be tapped off for use in monitoring. It is essential that the amount of light removed from the signal be small enough so that the signal is not disrupted or its integrity compromised. Fortunately, the human eye has the ability, in a darkened room and with time for adjustment, to detect very small amounts of light, as is well known.

Figure 2:
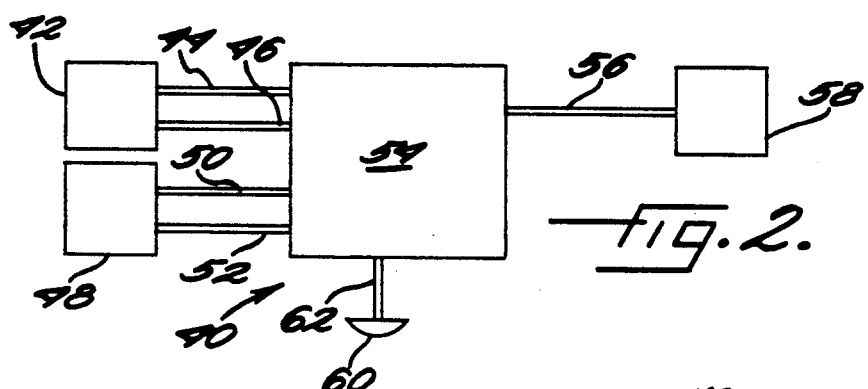
FIG. 2 is a diagrammatic view of a fiber optic device according to an alternative embodiment of the present invention.

In FIG. 2, a diagrammatic view of an alternative embodiment of the present invention is shown, namely, a fiber optic multiplexer 40. In particular, a first optical input device 42 has a transmit fiber 44 and a receive fiber 46. Similarly, a second optical input device 48 has a transmit fiber 50 and a receive fiber 52. A typical fiber optic multiplexer configuration may have as many optical input devices as reasonably possible. A fiber optic multiplexing device 54 manages the optical signals being transmitted by and received from optical devices 42 and 48, thereby allowing a single optical fiber 56 to carry all optical signals between optical devices 42, 48 and a destination device 58. A viewing means 60 is connected to fiber optic multiplexer 54 by a tapping means 62 and is used in combination with fiber optic multiplexer 54 to indicate the operational state of multiplexer 40.

Numerous monitoring possibilities exist for multiplexer 40. A plurality of viewing means 60, each one corresponding to each optical input device 42 and 48, or to each transmit fiber 44, 50, and each receive fiber 46, 52, can be used to independently monitor the operational state of each input device 42, 48. Alternatively, viewing means 60 can be connected to monitor the optical transmission occurring in the single multiplexed optical fiber 56. This embodiment is suitable for verifying that, for example, a telephone line with several subscribers is in use without knowing which subscriber is using the line.

Figure 3:
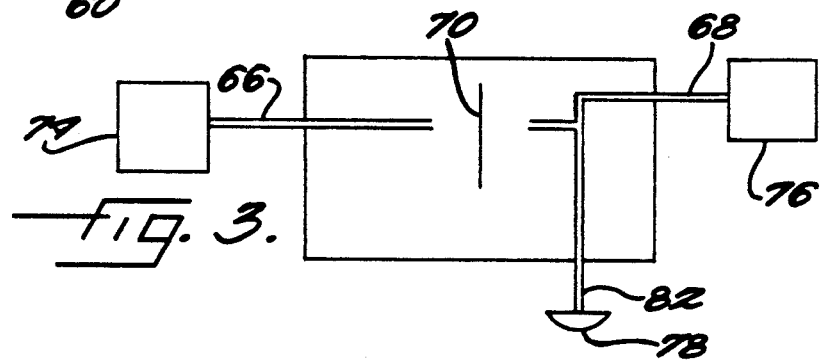
FIG. 3 is a diagrammatic view of a fiber optic device according to an alternative embodiment of the present invention.

FIG. 3 shows the present invention in combination with a fiber optic switch configuration as another alternative embodiment of the present invention. An optical input fiber 66 is connected to an optical output fiber 68 through a conventional fiber optic switch 70. Input fiber 66 transmits optical signals from an optical input means 74 to an optical output means 76 only when fiber optic switch 70 is on. Fiber optic switch 70 is preferably one of a number of well known devices that are triggered by various existing methods.

A tapping means 82, preferably an optical fiber connects optical output fiber 68 to viewing means 78. Viewing means 78, preferably a divergent lens, monitors transmitted signals carried through fiber 68 to optical output means 76. The operational state of optical output fiber 68 also identifies the position of fiber optic switch 70, since signals can only be transmitted through to fiber 68 when switch 70 is on. In other words, positive identification in the form of dispersed light by viewing means 78 indicates that optical output fiber 68 is transmitting optical signals and that fiber optic switch 70 is on. If input means 74 and output means 76 are remote from switch 70, there would be no way to confirm, in the absence of viewing means 78, that switch 70 were off or on.

Figure 4:
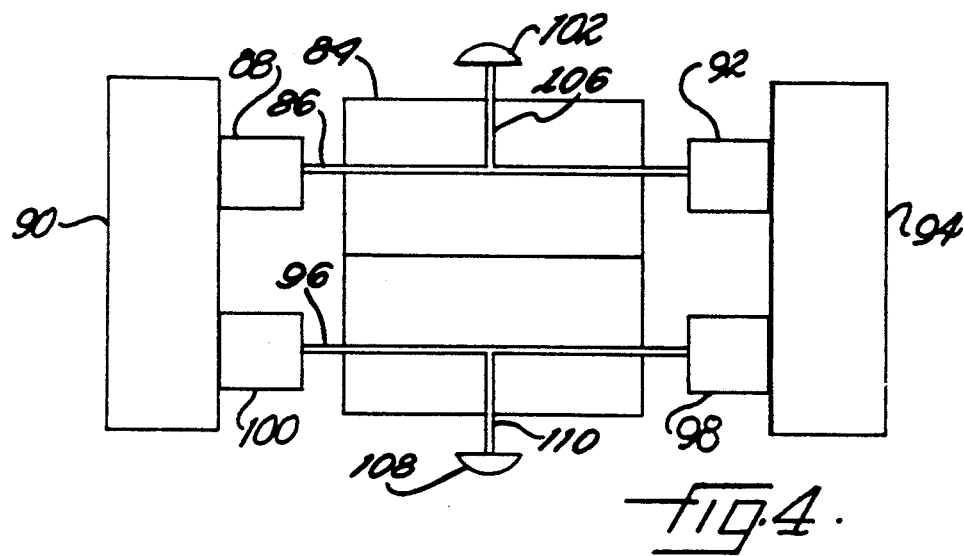
FIG. 4 is a diagrammatic view of a fiber optic device according to an alternative embodiment of the present invention.

FIG. 4 shows a diagrammatic representation of yet another alternative embodiment of the present invention, namely, a plurality of fiber optic monitors is used to indicate transmitted signals for a plurality of optical fibers connecting a plurality of fiber optic devices. Further, the plurality of optical fibers and monitoring devices is contained in a common housing 84 for spatial and structural convenience.

In particular, a first optical fiber 86 carries fiber optic signals from a first transmitting means 88 of a first optical device 90 to a second receiving means 92 of a second optical device 94. Likewise, a second optical fiber 96 carries fiber optic signals from a second transmitting means 98 of second device 94 to a first receiving means 100 of first optical device 90. A first viewing means 102 uses a first tapping means 106, preferably an optical fiber, to tap into first optical fiber 86 to indicate the presence of transmitted signals as previously described herein. Similarly, a second viewing means 108 uses a second tapping means 110 to tap into second optical fiber 96 to indicate the presence of transmitted signals passing through it. Although the figure shows the use of only two viewing means, 102, and 108, it is obvious that any feasible number of viewing means can be used within common housing 84. In practice, a row or matrix of viewing means could be established to follow at a glance the communication or transmission of signals between points.

In use, referring again to FIG. 1, connecting end 26 of tapping means 22 is connected through housing 12 through to light carrying means 14. When light carrying means 14 transmits an optical signal from transmitting end 18 to receiving end 20, tapping means 22 diverts an insignificant portion of the optical signal and carries it to non-connecting end 30 of tapping means 22. Viewing means 28 then disperses the light at an angle that facilitates viewing. Thus, when dispersed light is not emanating from viewing means 28, no optical signal is being transmitted through light carrying means 14.

It will be apparent to those skilled in the art that many changes and substitutions can be made to the preferred embodiment herein described without departing from the spirit and scope of the present invention as defined by the appended claims.

What is claimed is:

1. An apparatus for monitoring at least one transmitted signal in a light carrying means, said apparatus comprising:
    tapping means for tapping into said light carrying means and obtaining a portion of said transmitted signal; and
    viewing means for viewing said portion of said transmitted signal, said viewing means receiving said portion from said tapping means and dispersing said portion of said transmitted signal over a solid angle, said solid angle dimensioned so that said dispersed light can be seen without the need to be aligned with the axis of said optical fiber to receive said portion from said tapping means.

2. The apparatus as recited in claim 1, wherein said tapping means further comprises an optical fiber.

3. The apparatus as recited in claim 1, wherein said portion of said transmitted signal is small enough so that said transmitted signal is not disrupted.

4. The apparatus as recited in claim 1, wherein said viewing means further comprises a divergent lens.

5. The apparatus as recited in claim 1, wherein said light carrying means further comprises a plurality of optical fibers and said tapping means further comprises a fiber optic multiplexer, said plurality of optical fibers in optical communication with said multiplexer, said multiplexer repeatedly tapping, in sequence, each optical fiber of said plurality of optical fibers, said viewing means permitting a determination of whether each of said plurality of optical fibers is transmitting.

6. An apparatus for monitoring at least one transmitted signal in a light carrying means, said apparatus comprising:
- an optical fiber having a connecting end and a non-connecting end, said connecting end tapped into said light carrying means so that, when said light carrying means carries said transmitted signal, said optical fiber obtains and carries a portion of said transmitted signal without disrupting said transmitted signal;
- a divergent lens for viewing said portion of said transmitted signal, said divergent lens generally occupying said non-connecting end of said optical fiber, said divergent lens receiving said portion from said tapping means and dispersing said portion of said transmitted signal over a solid angle, said solid angle dimensioned so that said dispersed light can be seen without the need to be aligned with the axis of said optical fiber to receive said portion from said tapping means.

7. The apparatus as recited in claim 6, wherein said light carrying means further comprises a plurality of signal carrying optical fibers and said optical fiber moves from one of optical fiber of said plurality of signal carrying optical fibers to another, said portion being obtained in a repeated series from said plurality of optical fibers.

8. A method for monitoring at least one transmitted signal in a light carrying means, said method comprising the steps of:
- tapping into a first optical fiber with a second optical fiber so that a portion of any light carried by said first optical fiber is then carried by said second optical fiber; and
- dispersing said portion of light into a solid angle for viewing, said solid angle dimensioned so that said dispersed light can be seen without the need to be aligned with the axis of said optical fiber to receive said portion from said first optical fiber.

* * * * *